United States Patent
Bareket et al.

(10) Patent No.: US 11,271,899 B2
(45) Date of Patent: Mar. 8, 2022

(54) IMPLEMENTING A MULTI-REGIONAL CLOUD BASED NETWORK USING NETWORK ADDRESS TRANSLATION

(71) Applicant: Perimeter 81 LTD, Tel-Aviv (IL)

(72) Inventors: Amit Bareket, Tel-Aviv (IL); Sagi Gidali, Rishon-LeZion (IL)

(73) Assignee: Perimeter 81 LTD, Tel-Aviv (IL)

( * ) Notice: Subject to any disclaimer, the term of this patent is extended or adjusted under 35 U.S.C. 154(b) by 0 days.

(21) Appl. No.: 16/988,658

(22) Filed: Aug. 9, 2020

(65) Prior Publication Data
US 2022/0045984 A1    Feb. 10, 2022

(51) Int. Cl.
*G06F 15/16* (2006.01)
*H04L 61/2503* (2022.01)
*H04L 29/06* (2006.01)
*H04L 12/66* (2006.01)

(52) U.S. Cl.
CPC .......... *H04L 61/2503* (2013.01); *H04L 12/66* (2013.01); *H04L 63/20* (2013.01)

(58) Field of Classification Search
CPC ...... H04L 61/2503; H04L 12/66; H04L 63/20
USPC ........................................................ 709/245
See application file for complete search history.

(56) References Cited

U.S. PATENT DOCUMENTS

| | | | | |
|---|---|---|---|---|
| 8,892,778 B2 * | 11/2014 | Rao | ........................ | H04L 63/20 709/245 |
| 10,708,232 B2 * | 7/2020 | Hristov | ................... | H04L 63/10 |
| 10,911,407 B1 * | 2/2021 | Warburton | .............. | H04L 63/20 |
| 2003/0233576 A1 * | 12/2003 | Maufer | ............... | H04L 61/2564 709/226 |
| 2010/0232429 A1 * | 9/2010 | Rao | ........................ | H04L 63/061 370/389 |
| 2012/0216272 A1 * | 8/2012 | Hunyady | .............. | H04L 63/029 726/12 |
| 2013/0332986 A1 * | 12/2013 | Sima | ........................ | H04L 63/20 726/1 |
| 2013/0346629 A1 * | 12/2013 | Wang | ................... | H04L 61/2546 709/245 |
| 2015/0281642 A1 * | 10/2015 | Yang | .................... | H04L 61/2503 348/14.01 |
| 2019/0044933 A1 * | 2/2019 | de Andrade | ............ | H04L 63/08 |
| 2020/0099661 A1 * | 3/2020 | Duval | ..................... | H04L 12/66 |

\* cited by examiner

Primary Examiner — Bharat Barot (57) ABSTRACT

Provided herein are systems, devices and methods for applying address translation to network traffic originating from client devices having dynamic Internet Protocol (IP) addresses to support IP based security measures using a gateway configured to connect a plurality of client devices used by a plurality of users to a plurality of cloud based networks. The gateway may receive, from a client device assigned a dynamic IP address, credentials of a user using the respective client device, access a translation record mapping the user, identified by his credentials, to a respective unique static IP address, adjust a source address of each packet received from the client device to include the static IP address, and forward each adjusted packet to a security engine configured to apply security policy(s) to each adjusted packet before transmitting it to the cloud based network(s). The security policy(s) is applied according to the static IP address.

14 Claims, 2 Drawing Sheets

IMPLEMENTING A MULTI-REGIONAL CLOUD BASED NETWORK USING NETWORK ADDRESS TRANSLATION

FIELD AND BACKGROUND OF THE INVENTION

The present invention, in some embodiments thereof, relates to adjusting network traffic to support user centric security measures which are based on Internet Protocol (IP) addresses, and, more specifically, but not exclusively, to applying address translation to cloud based network traffic exchanged with client devices to support IP based security measures.

With the rapid and overwhelming growth of cloud based services, platforms and infrastructures, as well as employees working remotely cloud networking is also gaining a constantly growing share in network deployment for a plurality of applications and infrastructures operated by a plurality of companies, organizations, institutions and/or the like.

Moreover, since cloud networking is offered as a service, for example, Network as a Service (NaaS) by several major information and technology companies, the cloud based networks have long become multi-tenant and multi-regional network environments in which multiple companies, organizations, institutions and/or the like may share the same platform to construct their own private, independent and isolated networks.

Multi-tenant and multi-regional network environments may naturally introduce major security challenges and/or enhance existing security vulnerabilities thus requiring extensive sophisticated security resources to ensure the segregation, privacy and/or security of each of the private cloud based networks.

SUMMARY OF THE INVENTION

According to a first aspect of the present invention there is provided a system for applying address translation to network traffic originating from client devices having dynamic Internet Protocol (IP) addresses to support IP based security measures, comprising a gateway configured to connect a plurality of client devices used by a plurality of users to a plurality of cloud based networks. The gateway is configured to:

Receive, from a respective one of the plurality of client devices assigned a dynamic P address, credentials of a respective user using the respective client device.

Access a translation record mapping each of the plurality of users to respective unique static IP addresses to retrieve the static IP address of the respective user identified by his credentials.

Adjust a source address of each packet received from the respective client device to replace the dynamic IP address with the static IP address of the respective user.

Forward each adjusted packet to a security engine configured to apply one or more security policies to the respective adjusted packet before transmitting the respective packet to one or more of the plurality of cloud based networks. T security engine applies the one or more security policies according to the static IP address of the respective user.

According to a second aspect of the present invention there is provided a computer implemented method of applying address translation to network traffic originating from client devices having dynamic Internet Protocol (IP) addresses to support IP based security measures, comprising using a gateway configured to connect a plurality of client devices used by a plurality of users to a plurality of cloud based networks. The gateway is used for:

Receiving, from a respective one of the plurality of client devices assigned a dynamic IP address, credentials of a respective user using the respective client device.

Accessing a translation record mapping each of the plurality of users to respective unique static IP addresses to retrieve the static IP address of the respective user identified by his credentials.

Adjusting a source address of each packet received from the respective client device to replace the dynamic IP address with the static IP address of the respective user.

Forwarding each adjusted packet to a security engine configured to apply one or more security policies to the respective adjusted packet before transmitting the respective packet to one or more of the plurality of cloud based networks. T security engine applies the one or more security policies according to the static IP address of the respective user.

According to a third aspect of the present invention there is provided a computer readable medium comprising instructions executable by a computer, which, when executed by the computer, cause the computer to perform a method according to the second aspect.

In a further implementation form of the first, second and/or third aspects, the gateway is configured to control network traffic transmitted to the respective client device by performing the following for each return packet transmitted to the respective client device:

Adjust a destination address of the return packet to replace the static IP address of the respective client device with the dynamic IP address of the respective client device.

Forward the adjusted return packet to the respective client device.

In a further implementation form of the first, second and/or third aspects, the translation record is constructed according to the Network Address Translation (NAT) protocol.

In a further implementation form of the first, second and/or third aspects, the respective client device is allowed to connect to the gateway after authenticated by a Software Defined Perimeter (SDP) controller associated with one or more of the cloud based networks, the SDP controller authenticates the respective user based on his credentials.

In a further implementation form of the first, second and/or third aspects, each client device connects to the gateway via a Virtual Private Network (VPN) link established using the credentials of the respective user, the VPN link is established with the respective client device using the dynamic IP address.

In a further implementation form of the first, second and/or third aspects, the security engine is a member of a group consisting of: a physical processing node and a virtual machine.

In a further implementation form of the first, second and/or third aspects, the gateway is a member of a group consisting of: a physical gateway and a virtual gateway.

In a further implementation form of the first, second and/or third aspects, the plurality of cloud based networks are configured to support a multi-tenant network environment in which each virtual network is accessible according to the one or more security policies by one or more users associated with one or more tenants.

In a further implementation form of the first, second and/or third aspects, the plurality of cloud based networks are configured to support a multi-region network environment in which users located in a plurality of different geographical regions use their respective client devices to access one or more of the virtual networks according to the one or more security policies.

In a further implementation form of the first, second and/or third aspects, one or more gateways such as the gateway are deployed in one or more edge server connected at an edge of the network in one or more of the plurality of geographical regions in close network proximity to an access point providing network connectivity to the client devices located in the one or more geographical regions.

In a further implementation form of the first, second and/or third aspects, the plurality of cloud based networks are implemented based on Network as a Service (NaaS).

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to adjusting network traffic to support user centric security measures which are based on Internet Protocol (IP) addresses, and, more specifically, but not exclusively, to applying address translation to cloud based network traffic exchanged with client devices to support IP based security measures.

According to some embodiments of the present invention, there are provided methods, systems, devices and computer program products for applying address translation to network traffic exchanged between client devices having dynamic network addresses which access one or more cloud based networks which are typically virtual networks. The address translation in applied to support deployment of service centric security measures to protect the cloud based networks by enforcing one or more security policies to the network traffic packets since the service centric security measures may be typically based on IP addresses, specifically the packets' source IP address.

Moreover, the plurality of cloud based networks may be configured as multi-tenant networks supporting multi-tenancy, i.e. hosting a plurality of separate and isolated private virtual networks which are allocated to different entities, for example, companies, organizations, institutions and/or the like. The cloud based networks may be optionally utilized using one or more cloud platforms, services and/or infrastructures, for example, Network as a Service (NaaS). Furthermore, the cloud based networks may be constructed as multi-region networks providing connectivity to users located at a plurality of different geographical regions.

The security measures, for example, one or more security engines such as, for example, a firewall, a next generation firewall provisioned as a Virtual Machine (VM) in the cloud for example which may be physical, virtual and/or a combination thereof may be therefore applied to ensure segregation, privacy and/or security of the multiple virtual networks. Specifically, the security engine(s) may apply one or more of the security policies which may define access rights for a plurality of users of the cloud based networks. The access rights may define, for example, access rights to one or more networked resources connected to one or more of the cloud based networks, access, manipulation, creation, deletion and/or transfer privileges of one or more of the files stored in the cloud based networks and/or the like.

Highly advanced and powerful security measures, for example, security engines, real and/or virtual are widely available and are in common use for enforcing security policies on network traffic to protect network resources. However, such security measures are typically service centric which means they are based on network addresses, specifically on IP addresses (IP based). As such, these security measures are configured to apply the security policies to network traffic (packets) based on the IP address of the packets' originating party, i.e. the source IP address. This is because traditionally, networks, real and/or virtual, are deployed at sites configured to host users connecting to the network using client devices (e.g. computer, server, mobile device, etc.) assigned with predefined (static) IP address.

However, the multi-tenant and multi-region cloud based networks may typically be user centric since they may serve users of different organizations having different network attributes (e.g. address ranges) and since they may provide connectivity to users using connecting to the network under different connection parameters possibly from different geographical regions. The connection parameters, for example, a used client device, a time of day, a date, a geographical region, a service provider (e.g., ISP) and/or the like, which may differ between users as well as for the same user, may naturally lead to dynamic network (IP) address allocation to the client devices used by the users accessing the cloud based networks.

Access to the cloud based networks is therefore controlled based on the users' identity and credentials rather than based on network (IP) addresses associated with the users, or more accurately IP addresses with the client devices used by the users where each of the users authorized to access the cloud based networks may be associated with one or more of the security policies defining the access rights allowed for the respective user.

Address translation may be therefore applied for the cloud based networks in order to make use and take advantage of the advanced and powerful IP centric security engines to enforce the security policies on network traffic exchanged with the client devices used by the users connecting to the cloud based networks.

To this end, each of the users who is registered and authorized to access one or more of the cloud based networks may be assigned a respective unique static IP address which may be pre-defined and associated with one or more security policies defining the access rights for the respective user.

After identifying each user requesting to connect to one or more of the cloud based networks according to his credentials, the respective static IP assigned to the respective user may be retrieved and used by one or more gateways, for example, a multi-region and distributed NaaS gateway running in a virtualized environment across multiple regions to apply the address translation. The gateways providing connectivity to the cloud based networks for the client devices used by the users may adjust each packet received from each of the client devices by adjusting the network address field of the packet to include the static IP address associated with the respective user instead of the dynamic IP address dynamically assigned to the client device depending on the connection parameters applicable for the respective client device.

Optionally, one or more of the gateways are deployed in edge servers located at an edge of the network in one or more geographical regions in close network proximity to one or more access points, for example, a router, a switch, a base station and/or the like which provide network connectivity and service to the client devices located in the respective geographical region(s).

Optionally, one or more of the client devices may establish a secure communication link with one or more of the gateways by applying one or more secure networking protocols, for example, a Virtual Private Network (VPN) link, a tunneling link and/or the like.

After adjusting each packet received from the client devices to apply the address translation, the gateway(s) may forward the adjusted packets which may be processed by the IP based security engines based on the static IP addresses identified in each of the adjusted packets. Since the security policy(s) associated with each of the authorized users is further associated with the unique static IP address assigned to the respective user, the IP based security engines may be effectively and efficiently applied to the adjusted network traffic packets.

Applying the address translation to make use of service centric and IP based security measures deployed to protect user centric cloud based networks may present major benefits and advantages compared to existing methods for protecting cloud based networks.

First, applying the address translation practically decouples the network data traffic layer controlled by the gateways from the security layer controlled by the security engines applied to monitor and enforce the security policies to the network traffic to protect the cloud based networks, in particular to ensure the isolation, segregation and privacy of the different tenants hoisted by the multi-tenant cloud based networks. This decoupling may allow for increased flexibility in the types of security engines and/or the security polices applied in the cloud based networks compared to combined data and security implementations as done by one or more of the existing methods. Moreover, the network traffic decoupling may practically turn each gateway combined with a respective security engine into a protected gateway easily and flexibly configured to apply the required security policies.

Moreover, using the existing advanced and powerful security measures to apply whitelisting, meaning that only network traffic associated with predefined IP addresses that are assigned only to authorized users may be granted access rights may significantly increase security of the cloud based networks while reducing the complexity, effort and/or cost compared to developing and deploying user centric security measures used by existing methods. Such user centric security engines may be highly complex and may require constant significant effort to update them to for the constantly and dynamically changing network environment. Moreover, user centric security engines may reduce network performance, for example, increase latency of transferred packets since each packet may need to be mapped to its respective originating user before processed to apply the security policy(s) applicable for the respective user.

Furthermore, since the IP based security measures are commonly deployed in existing systems, networks and/or platforms, applying the address translation may support easy adoption and major scaling of such existing network environments to be at least partially based on cloud virtual networks.

In addition, applying the address translation at the gateways may be completely transparent to the client devices thus requiring no change to the client devices, their software and/or execution flow for connecting to the cloud based networks. The connection links used by the client devices to connect to the cloud based networks, for example, the VPN links, the tunneling links are also unaffected by the address translation. As such, no additional effort, complexity and/or costs are inflicted on the client side to support the address translation and the use of the service centric security engines.

Finally, a unified security policy for a specific user ("user centric security") may be correctly and accurately applied regardless to the physical location (geographical region) of the user. Therefore, the security policies which may be configured via a unified management console based on user and/or device identity (ID) and then being translated automatically to the security engines that are based on IP addresses in the background may allow the users to enjoy a unified security experience regardless where they are.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
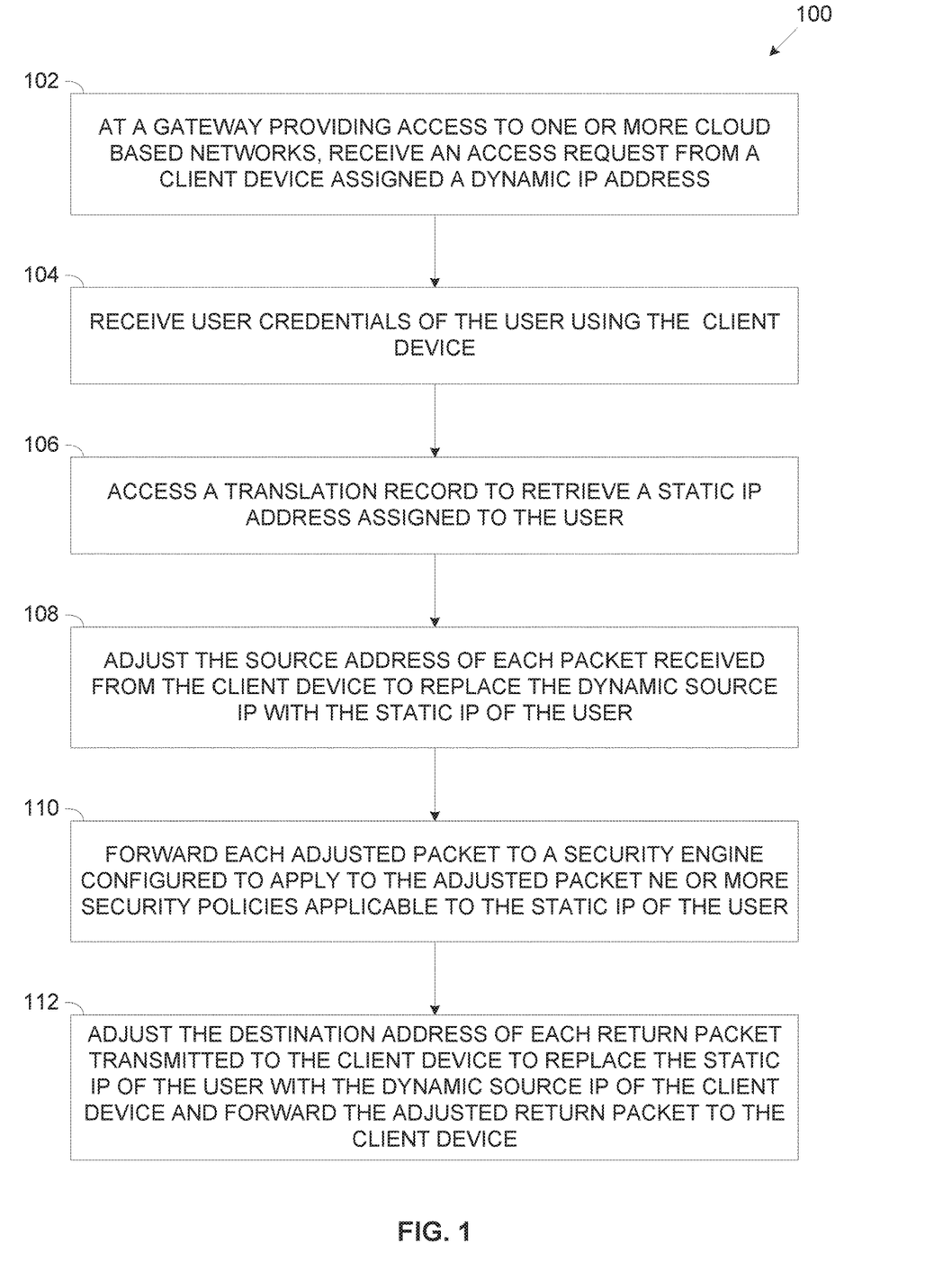
FIG. 1 is a flowchart of an exemplary process of applying address translation to network traffic originating from client devices to support IP based security measures, according to some embodiments of the present invention.

Referring now to the drawings, FIG. 1 illustrates a flowchart of an exemplary process of applying address translation to network traffic originating from client devices to support IP based security measures, according to some embodiments of the present invention. An exemplary process 100 may be executed by each of one or more gateways providing connectivity for a plurality of client devices to one or more of a plurality of cloud based networks typically virtual networks.

Figure 2:
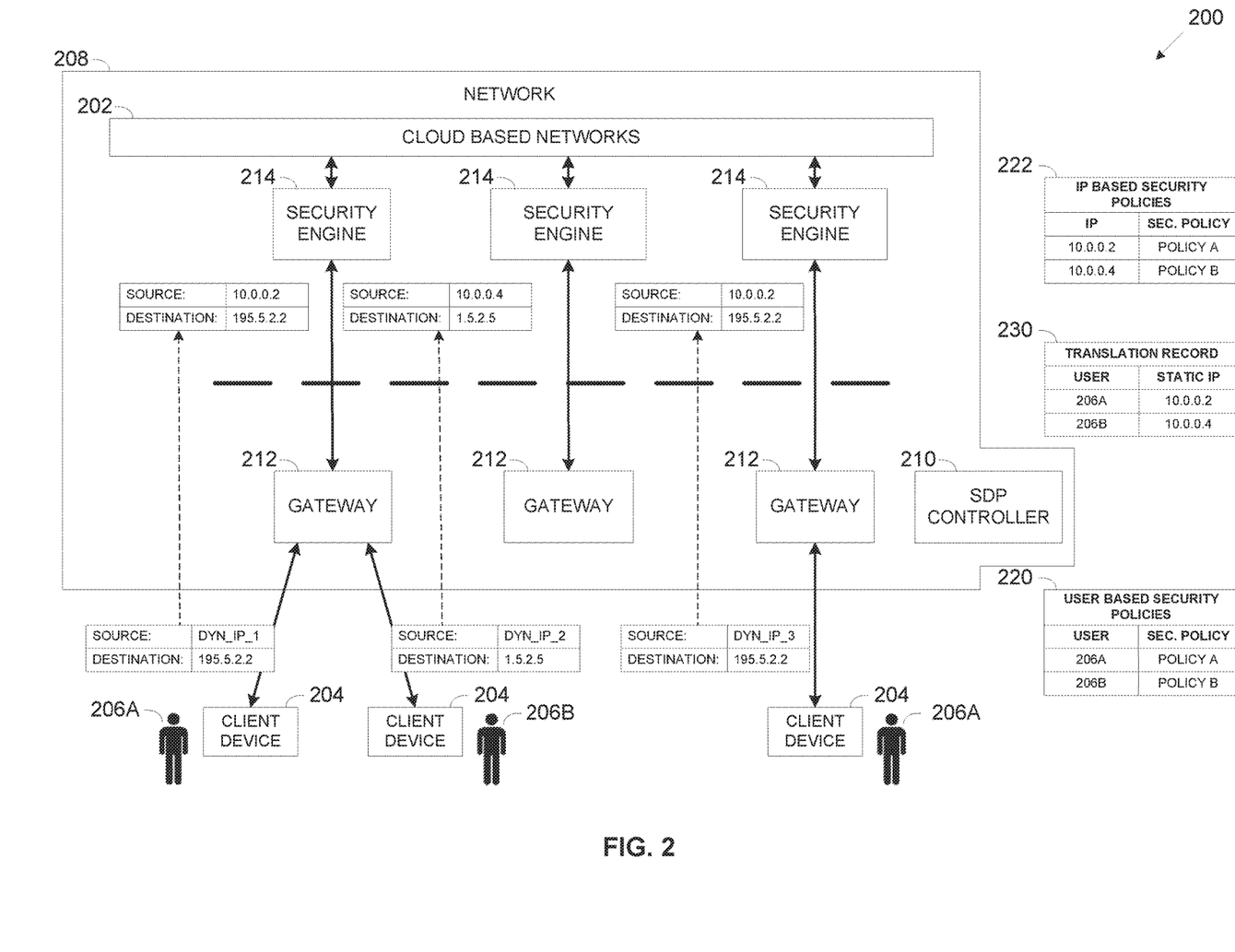
FIG. 2 is a schematic illustration of an exemplary system for applying address translation to network traffic originating from client devices to support IP based security measures, according to some embodiments of the present invention.

Reference is also made to FIG. 2, which is a schematic illustration of an exemplary system for applying address translation to network traffic originating from client devices to support IP based security measures, according to some embodiments of the present invention.

An exemplary system 200 may include one or more gateways 212 deployed to provide access to one or more client devices 204 to a network 208 comprising one or more wired and/or wireless networks, for example, a Local Area Network (LAN), a Wireless LAN (WLAN), a Wide Area Network (WAN), a Municipal Area Network (MAN), a cellular network, the internet and/or the like.

The network 208 may include one or more cloud based networks 202 typically virtual networks which are optionally utilized using one or more cloud services, platforms and/or infrastructures, for example, NaaS. Moreover, the cloud based networks 202 may be configured to support multi-tenancy by configuring one or more of the cloud based networks 202 as private virtual networks which are segregated, separated and isolated from the other cloud based virtual networks 202.

The client devices 204, for example, a server, a computer, a mobile device (e.g., Smartphone, tablet, etc.), a wearable device (e.g., smart watch, goggles, etc.) may be used and operated by respective users 206 accessing the network 208 including one or more of the cloud based networks 202.

Each of the client devices 204 may therefore include a network interface for connecting to the network 208 and/or one or more of the cloud based networks 202. Each of the client devices 204 may further include one or more processors capable of executing one or more software modules such as, for example, a process, a script, an application, an agent, a utility, a tool, an Operating System (OS) and/or the like each comprising a plurality of program instructions stored in a non-transitory medium (program store) of the respective client device 204. One or more of the client devices 204 may optionally include, utilize and/or otherwise facilitate one or more hardware modules (elements), for example, a circuit, a component, an IC, an Application Specific Integrated Circuit (ASIC), a Field Programmable Gate Array (FPGA), a Digital Signals Processor (DSP), a Graphic Processing Units (GPU) and/or the like. Each client device 204 may therefore execute one or more functional modules utilized by one or more software modules, one or more of the hardware modules and/or a combination thereof. In particular, each of the client devices 204 may execute one or more functional modules to access one or more of the cloud based networks 202.

One or more of the gateways 212 may provide access to the cloud based networks 202 for one or more of the client devices 204 connecting to the gateways 212 via one or more of the wired and/or wireless networks. One or more of the gateways 212 may be implemented using physical computing nodes, for example, a server, a computer and/or the like each having one or more processors and optionally one or more of the hardware modules and thus capable of execute one or more functional modules utilized by one or more software modules, one or more of the hardware modules and/or a combination thereof. However, one or more of the gateways 212 may be implemented using one or more virtual machines (VM) instantiated using resources, for example, computing resources, storage resources, networking resources and/or the like provided by one or more physical computing nodes and/or by one or more of the cloud platforms, services and/or applications, for example, the NaaS and/or the like. Each gateway 212 may therefore execute one or more software modules i.e. computer program comprising program code, optionally supported by one or more hardware modules for executing a process such as the process 100.

Moreover, one or more of the gateways 212 may be deployed in one or more edge servers connected at an edge of the network 208 in close network proximity to one or more access points, for example, a router, a switch and/or the like providing network connectivity to the client devices 204. In particular, the cloud based networks 202 may support multi-region connectivity such that user 206 located at different geographical regions may connect to the cloud based networks 202. As such, the gateways 212 may be deployed in edge servers which are located at one or more of a plurality of geographical regions in close network proximity to the access point(s) providing network connectivity to the client devices 204 located in the respective geographical regions.

The users 206, for example, a user 206A and a user 206B accessing one or more of the cloud based networks 202 via the gateways 212 may provide their credentials, for example, a user name, an identity, a password, a code and/or the like which may be analyzed typically by one or more to authenticate the respective user 206. Moreover, each user 206 may be associated with access rights, for example, access rights to networked resources of one or more of the cloud based networks 202, access and manipulation privileges for viewing, altering and/or downloading files from the cloud based networks 202 and/or the like.

Typically, one or more Software Defined Perimeter (SDP) controller 210 may be deployed to control access of the user 206 to the cloud based networks 202 by controlling one or more of the getaways 212 to open connections for one or more of the client devices 204 and connect the client devices 204 to one or more of the cloud based networks 202. The SDP controller 210 as known in the art is configured to control access to resources, specifically to the cloud based networks 202 based on identity of the accessing users 206. The SDP controller 210 may therefore analyze the credentials provided by each user 206 attempting to access the cloud based networks 202 as received from the respective client device 204 and determine whether the respective user 206 has access rights to one or more of the cloud based networks 202 and what type of access rights. Since the SDP controller(s) 210 are user centric, the SDP controller 210 may store and maintain one or more user access rights records, 220 for example, a table, a file, a database and/or the like which correlate each user 206, specifically each user authorized to access one or more of the cloud based networks 202, with his respective access rights. For example, an exemplary user based access rights record 220 may correlate a first security policy A with the user 206A and a second security policy B with the user 206B.

The client devices 204 operated by their respective users 206 may optionally connect to the gateways 212 via secure links, for example, a Virtual Private Network (VPN) link and/or the like to ensure security and privacy of the data exchanged between the client devices 204 and the gateways 212. To establish the VPN link, each client device 204 may transmit the credentials of the respective user 206. The SDP controller 210 may analyze the received credentials with respect to the user access rights records 220 and may allocate the respective access rights extracted from the record 220 to the respective VPN link, i.e., to the respective client device 204 used by the respective user 206.

One or more security engines 214 may control access rights, privileges and or the like of the users 206 to resources connected to one or more of the cloud based networks 202 and optionally to one or more public networks of the network 208. One or more of the security engines 214 may be implemented using physical computing nodes, for example, a server, a computer and/or the like configured to execute one or more functional modules utilized by one or more software modules, one or more of the hardware modules and/or a combination thereof. However, one or more of the security engines 214 may be implemented using one or VMs instantiated using resources, for example, computing resources, storage resources, networking resources and/or the like provided by one or more of the cloud platforms, services and/or applications, for example, the NaaS and/or the like.

The security engine(s) 214 may be service centric and thus IP centric such that they may control access rights and privileges of the network traffic (packets) based on the address of the source network node, i.e., the IP address identified in the source address filed of each incoming packet. To this end each security engine 214 may store and maintain one or more IP based access rights records 222 for example, a table, a file, a database and/or the like which correlate each IP address with respective one of a plurality of security policies defining the access rights for the respective IP address. Moreover, the security polices defined by the IP based access rights records 222 may correspond to respective security polices defined by the user based access rights records 220. For example, an exemplary IP based access rights record 222 may correlate the first security policy A with a first IP address 10.0.0.2 and the second security policy B with a second IP address 10.0.0.4.

Each of the gateways 212 may be further configured to apply address translation for network traffic packets exchanged between the client devices 204 and the based virtual networks 202. In particular, the gateways 212 may apply the address translation according to one or more translation records 230, for example, a Network Address Translation (NAT) record and/or the like mapping users such as the users 206 to static IP address. The translation record(s) 230 may be created, updated and/or adjusted in advance to define (pre-define) a respective unique static IP for each user 206 authorized to access one or more of the cloud based networks 202. For example, the user 206A may be assigned a first static IP address 10.0.0.2 and the user 206B may be assigned a second static IP address 10.0.0.4.

The translation record(s) 230, for example the NAT record(s) may be created, accessed, manipulated, adjusted and/or updated using one or more NAT protocols as known in the art.

As shown at 102, the process 100 starts with the gateway 212 receiving, via the network, an access request transmitted by one or more of the client devices 204. The access request to connect to one or more of the cloud based networks 202 may be initiated by one or more respective users 206 using the respective client devices 204.

The network address, for example, the IP address assigned to each client device 204 may be dynamic and may depend on one or more connection parameters, for example, a time of day, a geographical region, a service provider (e.g., ISP) and/or the like. For example, the client device 204 used by the user 206A may be assigned a first dynamic IP address DYN_IP_1 while the client device 204 used by the user 206B may be assigned a second dynamic IP address DYN_IP_2. Moreover, assuming the first user 206A using the same or a different client device 206 connects to the network with different connection parameters, for example, a different time and/or a different geographical region, the client device 204 used by the user 206A may be assigned a third dynamic IP address DYN_IP_3. Moreover, the client device 204 may typically connect to the gateway 212 via a secure link such as, for example, the VPN link.

The access request may be first received and controlled by the SDP controller 210. The SDP controller 210 may extract the credentials of the respective user 206 from the request, for example, an identity of the respective user such as, for example, a name, a user name, an account name, an account number and/or the like, a secret access code, for example, a password, a code and/or the like. The SDP controller 210 may then may determine, bay analyzing the extracted credentials of the respective user 206 compared to the user based access rights record 220, whether the user 206 using the respective accessing client device 204 is authorized to access one or more of the cloud based networks 202. Moreover, if the respective user 206 is authorized to access the cloud based network(s) 202, the SDP controller 210 may further determine, according to the user based access rights record 220, which access rights are assigned and valid for the respective user 206. For example, assuming the SDP controller 210 identifies that the access request originates from user 206A, the SDP controller 210, using the user based access rights record 220, may determine that the user 206A is associated with the security policy A defining a first set of access rights for the user 206A to one or more of the cloud based networks 202. In another example, assuming the SDP controller 210 identifies that the access request originates from user 206B, the SDP controller 210, using the user based access rights record 220, may determine that the user 206B is associated with the security policy B defining a second set of access rights for the user 206B to one or more of the cloud based networks 202.

As shown at 104, the gateway 212 may receive the credentials, comprising at least the identity, of the respective user 206 transmitted by the respective accessing client device 204 operated by the respective user 206 to connect to one or more of the cloud based networks 202.

The gateway 212 may extract the identity of one or more of the users 206 from the request received from the respective client devices 204. However, since typically the SDP controller first authorizes the access, in case the SDP controller 210 determines that the respective client device 204 is authorized to access one or more of the cloud based networks 202, the SDP controller 210 may transmit to the gateway 212 the identity of each authorized accessing user 206 and instruct the gateway 212 to accept the access request of the respective client device 204 and open a connection, for example, a link, a port, a socket and/or the like to establish a connection with the client device 204.

As shown at 106, the gateway 212 may access the translation record 230 and, using the identity of the user 206 associated with the respective accessing client device 204, the gateway 212 may retrieve the static IP address predefined for the associated user 206. For example, assuming the accessing client device 204 is used by the user 206A, the gateway 212 may access the translation record 230 and retrieve the static IP address 10.0.0.2 uniquely assigned to the user 206A. In another example, assuming the accessing client device 204 is used by the user 206B, the gateway 212 may access the translation record 230 and retrieve the static IP address 10.0.0.4 uniquely assigned to the user 206B.

As shown at 108, the gateway 212 may adjust each packet received from each accessing client device 204 which is transmitted to one or more of the networked resources connected to one or more of the cloud based networks 202 to replace the dynamic IP address assigned to the respective accessing client device 204 based on the connection parameter(s) with the static IP uniquely associated with the user 206 which was retrieved from the translation record 230. Specifically, the gateway 212 may adjust a source network address field of each packet received from each client device 204 to include the respective static IP uniquely associated with the user 206 of the respective accessing client device 204 instead of the original source IP address which is the dynamically assigned IP address. Typically, the gateway 212 may leave as is the destination IP address defined in a destination address field of each packet received from each accessing client device 204 since the destination IP address of each received packet indicates one or more networked resources connected to one or more of the cloud based networks 202 which are the destination of the respective packet.

For example, as seen in FIG. 2, assuming the client device 204 used by the user 206A under a first set of connection parameters is assigned the dynamic IP address, DYN_IP_1, the source network address field of each packet received by the gateway 212 from this client device 204 will include the value DYN_IP_1. Further assuming each of these packets is destined to a networked resource connected to one of the cloud based networks 202 having an IP address 195.5.2.2, the destination address field each such packet may include the IP address 195.5.2.2. In such case, the gateway 212 may adjust the source network address field of each packet received from the client device 204 to include the value of 10.0.0.2 as defined for the use 206A in the translation record 230 instead of the value DYN_IP_3. The gateway 212 may leave as is the destination IP address 195.2.2.5.

In another example, as seen in FIG. 2, assuming the client device 204 used by the user 206A under a second set of connection parameters is assigned the dynamic IP address, DYN_IP_3, the source network address field of each packet received by the gateway 212 from this client device 204 will include the value DYN_IP_3. Further assuming each of these packets is destined to the networked resource connected to one of the cloud based networks 202 having the IP address 195.5.2.2, the destination address field each such packet may include the IP address 195.5.2.2. It should be noted that while the user 206A using the client device(s) 204 assigned with the dynamic IP addresses DYN_IP_1 and DYN_IP_3 may access different networked resources of the cloud based networks 202 and the packets received from these client device(s) 204 may thus have different destination IP, for brevity, the same destination network resource is presented. In such case, the gateway 212 may adjust the source network address field of each packet received from the client device 204 to include the value of 10.0.0.2 as defined for the use 206A in the translation record 230 instead of the value DYN_IP_3. The gateway 212 may leave as is the destination IP address 195.5.2.2.

In another example, as seen in FIG. 2, assuming the client device 204 used by the user 206B is assigned the dynamic IP address, DYN_IP_2, the source network address field of each packet received by the gateway 212 from this client device 204 will include the value DYN_IP_2. Further assuming each of these packets is destined to a networked resource connected to one of the cloud based networks 202 having an IP address 1.5.2.5, the destination address field each such packet may include the IP address 1.5.2.5. In such case, the gateway 212 may adjust the source network address field of each packet received from the client device 204 to include the value of 10.0.0.4 as defined for the use 206B in the translation record 230 instead of the value DYN_IP_3. The gateway 212 may leave as is the destination IP address 1.5.2.5.

As shown at 110, the gateway 212 may forward each adjusted packet to one or more of the networked resources connected to one or more of the cloud based networks 202. For example, the gateway 212 may forward each adjusted packet, having its source network address set to 10.0.0.2, to the networked resource assigned the IP address 195.5.2.2. In another example, the gateway 212 may forward each adjusted packet, having its source network address set to 10.0.0.4, to the networked resource assigned the IP address 1.5.2.5. Each of the transmitted adjusted packets may be processed by one or more of the security engines 214 which may apply one or more of the security policies defined in one or more of the IP based access rights records 222. In particular, the security engine(s) 214 may apply the security policy(s) defined in the IP based access rights record(s) 222 according to the source address field of the adjusted packet which comprises the static IP address associated with the respective user 206. For example, the security engine(s) 214 may apply the security policy A to each adjusted packet having its source address field set to include the static IP address 10.0.0.2 associated with the user 206A. In another example, the security engine(s) 214 may apply the security policy B to each adjusted packet having its source address field set to include the static IP address 10.0.0.4 associated with the user 206B.

As shown at 112, the gateway 212 may adjust each return packet transmitted to one or more of the client device 204 from one or more of the networked resources connected to one or more of the cloud based networks 202 to replace the static IP uniquely associated with the user 206 with the dynamic IP address assigned to the respective accessing client device 204. Specifically, the gateway 212 may adjust a destination network address field of each return packet transmitted to each client device 204 to include the respective dynamic IP address of the respective client device 204 instead of the static IP used by the originating networked resource to respond to the respective client device 204.

For example, assuming a certain networked resource connected to one of the cloud based networks 202 transmits one or more return packets to the client device 204 assigned the dynamic IP address, DYN_IP_1, the destination network address field of each such return packet may include the value 10.0.0.2. In such case, the gateway 212 may adjust the destination network address field of each return packet transmitted to this client device 204 to include the value of DYN_IP_1 instead of the value 10.0.0.2. In another example, assuming a certain networked resource connected to one of the cloud based networks 202 transmits one or more return packets to the client device 204 assigned the dynamic IP address, DYN_IP_2, the destination network address field of each such return packet may include the value 10.0.0.4. In such case, the gateway 212 may adjust the destination network address field of each return packet transmitted to this client device 204 to include the value of DYN_IP_2 instead of the value 10.0.0.4.

After adjusting each return packet destined to one or more of the client devices 204, the gateway 212 may forward each adjusted return packet to their destination client device(s) 204. For example, the gateway 212 may forward each adjusted return packet, having its destination network address adjusted from 10.0.0.2 to DYN_IP_1, to the client device 204 associated with the user 206A. In another example, the gateway 212 may forward each adjusted return packet, having its destination network address adjusted from 10.0.0.4 to DYN_IP_2, to the client device 204 associated with the user 206B.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms NAT protocols and IP based security measures are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for applying address translation to network traffic originating from client devices having dynamic Internet Protocol (IP) addresses to support IP based security measures, comprising:

a gateway configured to connect a plurality of client devices used by a plurality of users to a plurality of cloud based networks, the gateway is configured to:
    receive credentials identifying a respective user using a respective client device of said plurality of client devices, wherein said respective client device is assigned a dynamic IP address;
    access a translation record mapping each of the plurality of users to a respective unique static IP addresses, based on an identity of said each of the plurality of users, defined by respective credentials of said each of the plurality of users;

retrieve from said translation record the static IP address of the respective user, according to the received credentials;

adjust a source address of each packet received from the respective client device by replacing the dynamic IP address of said respective client device with the static IP address retrieved from said translation record; and forward each adjusted packet to a security engine configured to apply at least one security policy to the respective adjusted packet before transmitting the respective packet to at least one of the plurality of cloud based networks, wherein the at least one security policy is applied according to the static IP address mapped to the respective user.

2. The system of claim 1, wherein the gateway is configured to control network traffic transmitted to the respective client device by performing the following for each return packet transmitted to the respective client device:

adjust a destination address of the return packet to replace the static IP address of the respective client device with the dynamic IP address of the respective client device, and forward the adjusted return packet to the respective client device.

3. The system of claim 1, wherein the translation record is constructed according to the Network Address Translation (NAT) protocol.

4. The system of claim 1, wherein the respective client device is allowed to connect to the gateway after authenticated by a Software Defined Perimeter (SDP) controller associated with at least one of the cloud based networks, the SDP controller authenticates the respective user based on his credentials.

5. The system of claim 1, wherein each client device connects to the gateway via a Virtual Private Network (VPN) link established using the credentials of the respective user, the VPN link is established with the respective client device using the dynamic IP address.

6. The system of claim 1, wherein the security engine is a member of a group consisting of: a physical processing node and a virtual machine.

7. The system of claim 1, wherein the gateway is a member of a group consisting of: a physical gateway and a virtual gateway.

8. The system of claim 1, wherein the plurality of cloud based networks are configured to support a multi-tenant network environment in which each virtual network is accessible according to the at least one security policy by at least one user associated with at least one tenant.

9. The system of claim 1, wherein the plurality of cloud based networks are configured to support a multi-region network environment in which users located in a plurality of different geographical regions use their respective client devices to access at least one of the virtual networks according to the at least one security policy.

10. The system of claim 9, wherein at least one gateway such as the gateway is deployed in at least one edge server connected at an edge of the network in at least one of the plurality of geographical regions in close network proximity to an access point providing network connectivity to the client devices located in the at least one geographical region.

11. The system of claim 1, wherein the plurality of cloud based networks are implemented based on Network as a Service (NaaS).

12. The system of claim 1, wherein said credentials identifying said respective user include at least one of a user name, an identity, a password and a code.

13. A computer implemented method of applying address translation to network traffic originating from client devices having dynamic Internet Protocol (IP) addresses to support IP based security measures, comprising:

using a gateway configured to connect a plurality of client devices used by a plurality of users to a plurality of cloud based networks, the gateway is used for:

receiving credentials identifying a respective user using a respective client device of said plurality of client devices, wherein said respective client device is assigned a dynamic IP address;

accessing a translation record mapping each of the plurality of users to a respective unique static IP addresses, based on an identity of said each of the plurality of users, defined by respective credentials of said each of the plurality of users;

retrieving from said translation record the static IP address of the respective user, according to the received credentials;

adjusting a source address of each packet received from the respective client device by replacing the dynamic IP address of said respective client device with the static IP address retrieved from said translation record; and forwarding each adjusted packet to a security engine configured to apply at least one security policy to the respective adjusted packet before transmitting the respective packet to at least one of the plurality of cloud based networks, wherein the at least one security policy is applied according to the static IP address mapped to the respective user.

14. A computer program product comprising a non-transitory computer readable storage medium storing program code thereon for execution by at least one hardware processor, said program code comprising:

program instructions to receive credentials identifying a respective user using a respective client device of said plurality of client devices, wherein said respective client device is assigned a dynamic IP address;

program instructions to access a translation record mapping each of the plurality of users to a respective unique static IP addresses, based on an identity of said each of the plurality of users, defined by respective credentials of said each of the plurality of users;

program instructions to retrieve from said translation record the static IP address of the respective user, according to the received credentials;

program instructions to adjust a source address of each packet received from the respective client device by replacing the dynamic IP address of said respective client device with the static IP address retrieved from said translation record; and program instructions to forward each adjusted packet to a security engine configured to apply at least one security policy to the respective adjusted packet before transmitting the respective packet to at least one of the plurality of cloud based networks, wherein the at least one security policy is applied according to the static IP address mapped to the respective user.

* * * * *